(No Model.)
A. WORDEN.
ANIMAL TRAP.
No. 409,381. Patented Aug. 20, 1889.
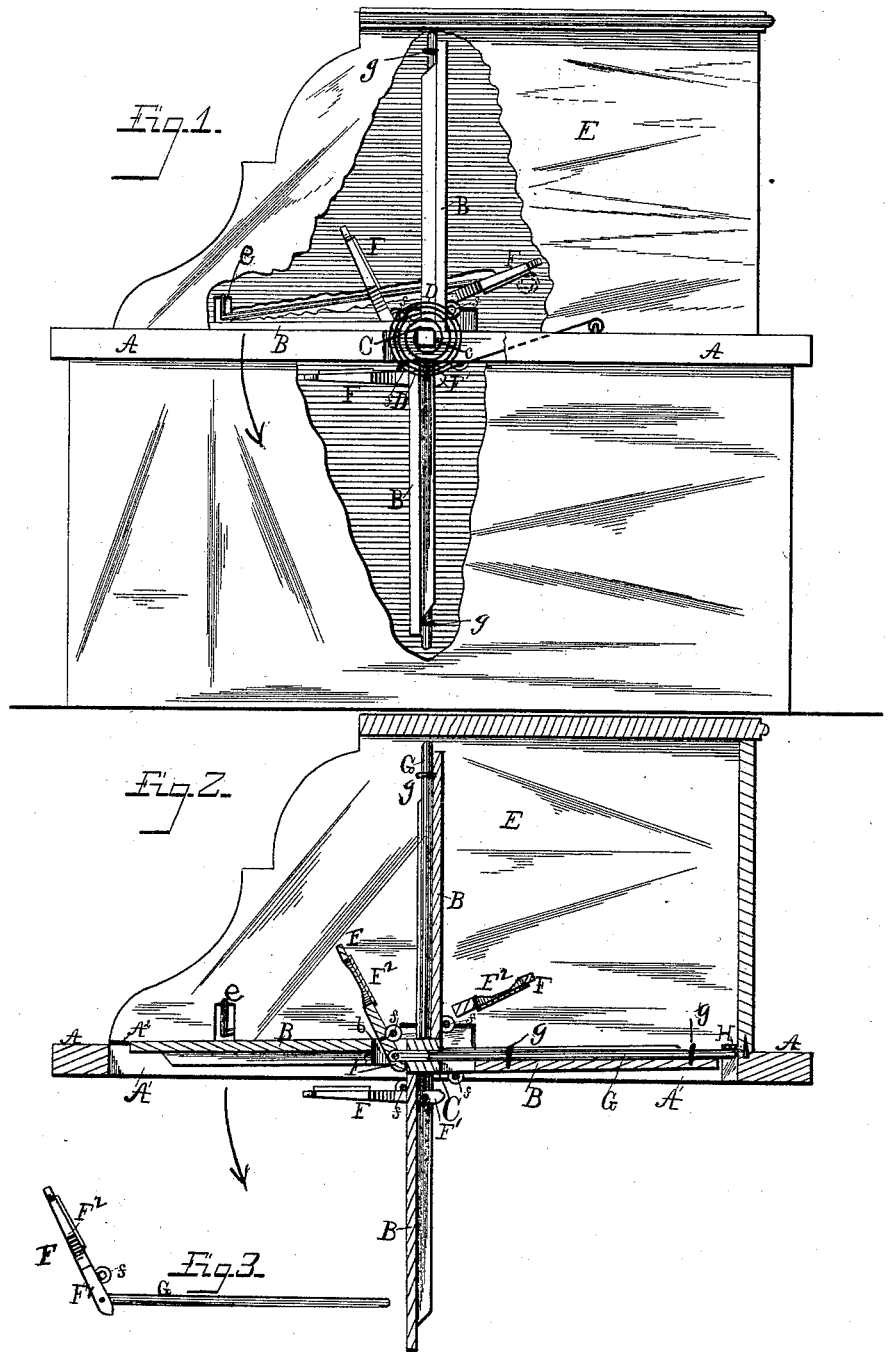
WITNESSES
John Bailey Johns.
Wm. H. Brereton
INVENTOR
Alexander Worden
By J. W. Tallmadge
Attorney

UNITED STATES PATENT OFFICE.

ALEXANDER WORDEN, OF PETOSKEY, MICHIGAN.

ANIMAL-TRAP.

SPECIFICATION forming part of Letters Patent No. 409,381, dated August 20, 1889.

Application filed April 29, 1889. Serial No. 309,020. (No model.)

*To all whom it may concern:*

Be it known that I, ALEXANDER WORDEN, a citizen of the United States, residing at Petoskey, in the county of Emmet and State of Michigan, have invented a new and useful Improvement in Animal-Traps, of which the following is a specification.

My invention is an improvement in animal-traps; and my said invention consists of a self-setting rotary trap somewhat in the form of a paddle-wheel, operated by a spring, and adapted to be arranged over a suitable receptacle, into which the animals are precipitated.

The object of this invention is to provide a simple trap for rats, mice, or small game that will be continuous in action and self-setting, so that a number of animals may be caught without setting the trap. To accomplish these results I proceed as follows, reference being had to the accompanying drawings, wherein—

Figure 1 is a view in side elevation and partial section of a self-setting rotary animal-trap constructed according to my invention arranged in position over a vessel, and Fig. 2 is a vertical longitudinal sectional elevation of the same. Fig. 3 is a detail view of the nose-piece and trip or bolt.

Similar letters of reference indicate like parts in the several figures.

The letter A designates a frame of any suitable dimensions, upon which the trap is secured, and which platform supports the trap over a barrel, box, or any other suitable vessel to receive the animals as caught. This platform A has a central opening A', within which is arranged a series of platforms B B, that are mounted and turn upon a central axle C, whose journal-bearings $c$ are upon the top of the frame A. Upon one end of the axle C is a coiled spring D, or a cord may be wound upon said axle, having a weight attached, which spring or cord is to turn the platforms B B.

E is a case or cover, closed except at the front, that closely incloses the platforms B. At the rear of each of the platforms B, of which there are preferably four, is a nose-piece F, that swings upon a pintle $f$, secured to said platform, and these nose-pieces F have an extension F', that extends through an opening $b$ in the platforms, and to which is secured a bolt G. This bolt G passes along the under side of the platform, and when in its projected or locked position extends out beyond the outer end of the platform and engages beneath a stop H, arranged along the inner end of the opening A' of the frame A. Each platform is provided with these nose-pieces F, to the back of which the bail is applied, and the bolts G are held in place by staples $g$.

The operation is as follows: The trap being first placed upon a box, barrel, or other receptacle, as shown in Fig. 1, the animal, attracted by the bait upon the back of the nose-pieces F, which bait is secured at the back of the nose-piece by any suitable means over the opening $F^2$ in said nose-piece, enters the case E upon the platform B, and in its efforts to reach the bait the nose-piece F is pushed back and the bolt G retracted from the stop H, when the spring, with the added weight of the animal, causes the platform to revolve in the direction of the arrow and precipitates the animal into the receptacle beneath. This revolution of the platform continues until the bolt of the platform in advance of the one just tripped is brought against the stop H, when the trap is again set. This operation may be repeated until the spring is run down. The platforms B are arranged at right angles to each other like the blades of a paddle-wheel, and when the trap is set the opening in the frame will be closed by two platforms and the other two platforms or paddles will stand at right angles to the other platforms, or vertically of the machine, as shown in Fig. 1. As the platforms drop down after the bolt is tripped, the weight of said bolt causes it to be again projected, so as to engage the stop H, and at the front edge of the opening A' is a slotted piece $A^2$ to permit the passage of the bolts past the same, and at the same time prevent the escape of the animal.

Instead of a spring being used, as here shown, the shaft C may be turned by a cord and weight, or other suitable means may be employed for this purpose, and instead of arranging the nose-pieces in a vertical position, as shown in Fig. 1, the same may be arranged horizontally, as shown in Fig. 3. At the side of the case E is arranged a spring-catch $e$, that prevents the platform being turned backward.

To wind up the trap, the catch $e$ is pressed out and the platforms turned backward until the spring is coiled, when the catch $e$ is released and the trap is again ready for use; or the spring may be wound up by a key applied to the end of the shaft.

Having thus described my invention, I claim as new and desire to secure by Letters Patent—

1. In a revolving animal-trap, the combination, with a suitable inclosed case E and frame A, with opening A', of the series of platforms B, mounted upon an axle C, journaled in the frame A and having attached thereto means for turning said axle, and nose-pieces F, pivotally connected to said platforms B and having extensions F', bolts G, connected to said extensions F' of the pivoted nose-pieces F, which bolts pass beneath the platforms B and project beyond the front edge thereof and engage a catch H at the rear of the frame A, as described, for the purposes specified.

2. In a revolving animal-trap, in combination with the platforms B, the nose-pieces F, pivoted to said platforms, having extensions F', that project below said platform, and opening $F^2$ for the bait, and bolts G, secured to the said extensions F' of the nose-pieces and extending beneath the platforms B, as described, for the purposes specified.

ALEXANDER WORDEN.

In presence of—
DAVID C. PAGE,
A. C. LITCHFIELD.